United States Patent [19]
Vogt et al.

[11] 3,884,814
[45] May 20, 1975

[54] APPARATUS FOR FRACTIONATING FLUIDS

[75] Inventors: Bernard Vogt; Michel Rochet, both of Rhone, France

[73] Assignee: Rhone-Poulenc, S.A., Paris, France

[22] Filed: July 23, 1973

[21] Appl. No.: 381,427

[30] Foreign Application Priority Data
July 26, 1972 France................ 72.26956
May 4, 1973 France................ 73.16147

[52] U.S. Cl................ 210/321; 55/158; 264/263; 264/271
[51] Int. Cl............................. B01d 31/00
[58] Field of Search.......... 264/258, 277, 263, 271; 55/158; 210/321, 22, 23; 29/163.5 F, 527.1 X

[56] References Cited
UNITED STATES PATENTS

| | | | |
|---|---|---|---|
| 3,422,008 | 1/1969 | McLain | 210/321 X |
| 3,455,460 | 7/1969 | Mahon et al. | 210/321 |
| 3,475,331 | 10/1969 | McLain | 210/321 |
| 3,503,515 | 3/1970 | Tomsic | 210/321 |
| 3,526,001 | 8/1970 | Smith | 210/23 |
| 3,660,281 | 5/1972 | Tober | 210/23 |
| 3,690,465 | 9/1972 | McGinnis et al. | 210/321 |
| 3,730,959 | 5/1973 | Horres, Jr. et al. | 210/321 |

*Primary Examiner*—Frank A. Spear, Jr.
*Attorney, Agent, or Firm*—Cushman, Darby & Cushman

[57] ABSTRACT

Apparatus for fractionating fluids in which a jacket encloses a plurality of hollow fibres arranged in the shape of a U, a core supporting the hollow fibres and being placed inside the branches of the U. The hollow fibres are fixed to one another near their ends by a mass of glue which fixes the fibres into bundles and to the core. At least one fluid inlet passage and at least one fluid outlet passage are formed in the casing and-/or lid of the jacket. The lid is provided with compartments so that fluid can enter the ends of the hollow fibres and leave therefrom, the space within the casing being connected to an inlet and/or outlet for fluid on the outside of the hollow fibres. A process for forming the elements of the fractionating apparatus involves winding the hollow fibres to form a skein, placing the skein on a primary core in the longitudinal position, fixing the fibres to the core and to one another by glue, attaching the core and hollow fibres to a collar or casing and cutting the skein of fibres optionally together with the collar or casing transversely to provide one or two U-shaped bundles of filaments on the core.

29 Claims, 21 Drawing Figures

APPARATUS FOR FRACTIONATING FLUIDS

The present invention relates to an apparatus for fractionating fluids which employs hollow fibres, as well as to the process which makes it possible to produce this apparatus.

The fractionation operations considered are essentially exchange operations (dialysis, direct osmosis, gas-gas exchanges and liquid-gas exchanges) and separation operations (ultrafiltration, reverse osmosis and gas permeation); these operations can of course be used for enriching purposes.

Fractionating apparatus with hollow fibres are already known, especially from French Pat. Nos. 1,307,979, 1,340,495, 1,568,113, and 2,017,387.

French Pat. No. 1,307,979 describes an apparatus containing one or more bundles of fibres arranged linearly, supported at their ends but not at their centre; the bundles of fibres are produced by coating the ends of the hollow fibres (previously cut) by means of an adhesive material but this technique is very difficult to carry out because the adhesive material has a tendency to enter inside the fibres and to seal them. Moreover, since each elementary bundle is not rigid, its replacement is a little inconvenient.

French Pat. Nos. 1,340,495 and 2,017,387 describe bundles of hollow fibres in the shape of a U, the fibres of which are supported only at their ends; such an apparatus has several disadvantages, especially due to the fact that, since a bundle is not rigid (the fibres are flexible, its replacement is difficult, especially when the apparatus is in a horizontal position or in a vertical position with the hollow fibres opening downwards. Moreover, this apparatus scarcely makes it possible to carry out exchange between two fluids, but only separation from one fluid.

French Pat. No. 1,568,113 describes various forms of apparatus with hollow fibres, the fibres of which are coiled transversely on a hollow mandrel; this arrangement is in fact difficult to produce because it is necessary to cut the coiled hollow fibres with a series of radial perforations; moreover, this apparatus is essentially a separating apparatus and cannot be used as an exchange apparatus.

Finally, French Patent application No. 2,027,553 describes further forms of apparatus with hollow fibres for separation by selective permeability, comprising a jacket and a plurality of hollow fibres in the shape of a U. Moreover, this apparatus can comprise a porous flexible sleeve (for example, made of woven fabric) which is inserted longitudinally quite close to the centre of the bundle of fibres, after this bundle has been produced. The function of this sleeve is to make it easier to insert the perforated tube (tube for supplying fluid to the apparatus) inside the bundle of hollow fibres, and not to support the hollow fibres; in actual fact, these fibres have a tendency to float.

According to the present invention we provide apparatus which can be used especially for fractionating fluid mixtures, said apparatus comprising:

a. a jacket;
b. a plurality of hollow fibres arranged in the shape of at least one U and positioned within the jacket;
c. a core supporting the hollow fibres and placed inside the branches of the U;
d. means for fixing the fibres to one another at their ends, said means being fixed to the core;
e. at least one fluid inlet passage formed in the jacket; and
f. at least one fluid outlet passage formed in the jacket.

Diverse variants of apparatus made up in this way can be produced, these variants being more specifically adapted to the type of fractionation desired. Thus, separating apparatuses (ultrafiltration apparatuses, reverse osmosis apparatuses and gas permeation apparatuses) can be distinguished from exchange apparatuses (dialysers, gas-gas exchange apparatuses, gas-liquid exchange apparatuses and direct osmosis apparatuses). By dialysis, there is meant particularly the exchange of solutes between two liquid fluids. By ultrafiltration, there is meant particularly the filtration, under pressure, of solutes which have a markedly higher molecular weight than that of the solvent in which they are dissolved, for example greater than 500.

The jacket of the apparatuses according to the invention advantageously comprises two elements which are firmly fixed to one another or are independent of one another, the one denoted hereafter by the term casing and the other being a lid.

The function of the jacket is to isolate the hollow fibres and circulating fluids from the exterior.

The casing usually forms the part of the jacket situated around the hollow fibres while the lid usually forms the part of the jacket at the open end of the hollow fibres. This lid can moreover be divided into at least two compartments corresponding to each of the branches of the U-shaped bundle or bundles formed by the hollow fibres, each of these compartments being themselves equipped with an inlet or outlet passage.

The hollow fibres, which can be as many as several thousands in number, are usually arranged in the form of one or more bundles, these bundles being themselves in the shape of a U; optionally, they may not be stretched in order to facilitate the passage of fluids between them.

It is to be understood that, in the present Specification the expression "hollow fibres" denotes fibres of tubular shape, that is to say fibres which contain within them a continuous channel located substantially along the axis of the fibre and free from macromolecular material.

The hollow fibres which can be used according to the invention can be of any known type, and in particular they can be the fibres mentioned in French Pat. Nos. 1,307,979, 1,586,563 and 2,017,387; these fibres can be homogeneous or microporous or anisotropic (that is to say "with a skin"); they can be produced by a melt method, by a dry method (evaporation of the solvent) or by a wet method (coagulation); the spinnerets employed are in practice sector spinnerets or spinnerets which have an orifice in the shape of a ring. The fibres which can be used in the invention have an external diameter which is generally less than 1 mm and preferably less than 0.6 mm and which can even be between 5 and 100$\mu$.

The exact nature of the hollow fibres is chosen as a function of the envisaged application (dialysis, ultrafiltration, gas-gas exchange or gas-liquid exchange and the like).

The function of the core mentioned above under paragraph c) is, in particular, to support the hollow fibres, this core being placed inside the U formed by the hollow fibres. The core thus assists in the arrangement and positioning of the hollow fibres and, like the jacket, it can also be used to isolate the hollow fibres from the exterior.

The core can have the most diverse shapes, for example, it can be a simple plate. However, preferably the core contains at least one U-shaped groove, intended to form a recess for the hollow fibres; by U-shaped groove, there is to be understood not the shape of a cross-section of the groove but the general shape of the whole of the groove. Such a U-shaped groove makes it possible to support the hollow fibres better. According to an advantageous embodiment of the invention, the core can be a profiled bar of a cruciform cross-section or with a cross-section in the shape of an H even of a star with an even number of branches.

In certain cases, and especially that of separating apparatus in which the fluid under pressure flows outside the fibres, the core can be perforated or can be made of a porous material, and can even contain or central axial channel; in the latter case, this central channel is advantageously coaxial with a tube of the casing, this tube forming an inlet passage for the fluid to be treated or an outlet passage for the treated fluid. Furthermore, the central channel is advantageously connected to outside the core by small channels arranged radially.

The apparatuses according to the invention also comprise, according to paragraph d) mentioned above, a means for fixing the fibres to one another at their ends. This is usually a hardened mass (preferably of solidified glue) in which the ends of the hollow fibres are embedded, without the central channel of these fibres being sealed in any way. The hardened mass not only fixes the hollow fibres relative to one another but also fixes them together relative to the core. Preferably, this hardened mass is not generally a single mass but rather a collection of 2 n masses, n being the number of bundles of fibres. From the chemical point of view, the hardened mass is generally solidified glue which may be quick-setting or slow-setting, with 1 or 2 constituents. Alkyl cyanoacrylates may be mentioned as quick-setting glues; epoxy resins may be mentioned as slow-setting glues. However, other glues such as those mentioned in French Pat. No. 1,307,979 may be used.

The fluid inlet passage or passages (fluid to be treated) and at least one fluid outlet passage or passages (treated fluid), which are formed in the jacket, can be provided in the casing and/or the lid of the jacket, depending on the particular cases; generally, the casing and the lid each contain at least one inlet or outlet passage.

These inlet and outlet passages are connected in the one case to the zone situated inside the hollow fibres and in the other case to the zone situated outside the hollow fibres.

The exact number and the arrangement of the fluid inlet and/or outlet passages depends especially and principally on the choice made relating to the circuits of fluids to be fractionated.

Thus, when an apparatus according to the invention functions as a dialyser, it advantageously comprises at least two inlet passages and two outlet passages, because, in dialysis, it is preferable to have at least two fluids passing right through the apparatus.

The invention also provides a single fractionating cell mountable in a jacket, said cell comprising:

a. a plurality of hollow fibres arranged in the shape of at least one U;

b. a core supporting the hollow fibres and placed inside the branches of the U;
c. means for fixing the fibres to one another at their ends, said means being firmly fixed to the core; and
d. a collar surrounding said fixing means.

Such a cell may be secured in a jacket to form a fractionating apparatus, the cell being fixed to the jacket by the collar, which may, for example, be threaded for the purpose.

According to another respect of the invention, we provide a process for the manufacture of a fractionating element, for use in apparatus for fractionating fluid mixtures, said process comprising the steps of:

a. winding hollow fibres in such a way as to form a skein;
b. placing said skein on a primary core in the longitudinal position;
c. sealing the fibres to the core and to one another by means of a hardenable material;
d. attaching the primary core and the hollow fibres to a collar or casing; and
e. cutting the skein of hollow fibres transversely of their length to form at least one U-shaped bundle of hollow fibres.

In order that the way in which apparatus according to the invention can be made shall be better understood, various embodiments of such apparatus as well as of the components from which they are constructed, the following description is given by way of illustrating and non-limiting example, reference being made to the accompanying drawings, in which.

Figures 1, 2:
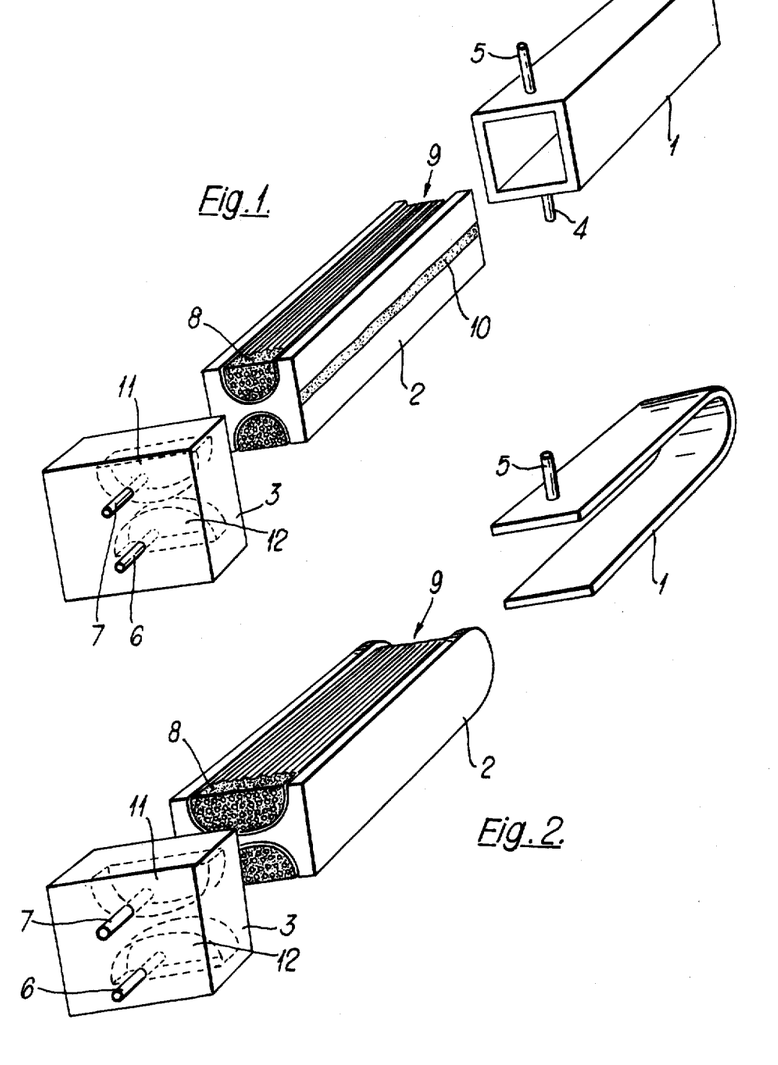
FIG. 1 is an exploded view, in perspective, of one embodiment of apparatus according to the invention.
FIG. 2 is a similar view showing a variant of the apparatus of FIG. 1.

The apparatus illustrated in FIG. 1 comprises a jacket consisting of a casing 1 and of a closing lid 3 which is itself divided onto two compartments 11 and 12 and is produced in such a way as to ensure leakproofness between the various fluid circuits.

A plurality of hollow fibres 9 are arranged in the shape of a U, the ends corresponding to one of the branches of the U open into one of the compartments 11 while the other ends open into the other compartment 12. In order to support the hollow fibres, the fibres are wrapped around a core 2 with a cross-section in the shape of an H which fits exactly into the inside of the casing 1 so that when the apparatus is assembled, the casing completely hides the hollow fibres. The casing can contain a lining, for example of foam, for the purpose of avoiding dead volumes in the apparatus. A zone which consists of glue when the apparatus is assembled has been represented at 10 and provides a partition in the casing 1 which prevents the fluid to be separated from passing directly from the tube 4 to the tube 5, to be described later. The applications where this direct passage is to be avoided are especially, firstly, exchange operations such as dialysis, and secondly, separation operations (such as ultrafiltration and reverse osmosis) when the liquid under pressure is outside the hollow fibres.

As shown in the Figure, the open ends of all the hollow fibres are embedded (and thereby fixed to one another) in a hardened mass 8, which mass in fact consists of two elementary masses arranged symmetrically relative to the core. This hardended mass 8 consists of hardened glue which adheres to the core 2 and ensures leakproofness between fluid circuits both with the casing 1 and with the lid 3 and the core 2. Four inlet and/or outlet tubes 4, 5, 6 and 7 are provided, the tubes 6 and 7 being connected respectively to the compartments 12 and 11 of the lid 3, and thus to the two groups of hollow fibre ends.

Although this has not been represented in FIG. 1, the lid 3 and the core 2 or the casing 4, can be equipped respectively with studs and holes (or vice versa) which make it easier to position and attach the lid when the fractionating apparatus is being assembled. Morover, the core 2 can have a narrower portion on the part situated outside the mass 8, this narrower portion allowing the hollow fibres a certain play which can facilitate the operations of assembling the apparatus.

The apparatus with four tubes of FIG. 1 can function in practically all the applications of the apparatuses of the invention, such as dialysis, direct osmosis, gas-liquid exchange and gas-gas exchange, where two different fluids flow through the apparatus; there are two fluid inlet tubes, for example 4 and 6 and two fluid outlet tubes, for example 5 and 7 so that one of the fluids flows inside the hollow fibres, with the other fluid flowing outside and around the hollow fibres.

When the apparatus according to the invention is used in ultrafiltration or reverse osmosis, the solution under pressure to be fractionated can be inside or outside the hollow fibres. When it is outside the hollow fibres, it is supplied via the tube 4 and leaves via the tube 5 whilst the ultrafiltrate or the osmosate leaves by the two tubes 6 and 7.

When the solution to be fractionated by ultrafiltration or reverse osmosis flows inside the hollow fibres, it is supplied via the tube 6 and leaves via the tube 7, (or vice versa), whilst the ultrafiltrate or osmosate leaves by the two tubes 4 and 5 (or via only one of these two tubes if the other is sealed).

In gas permeation, the fluid flow diagrams are similar to those existing for ultrafiltration.

The apparatus of FIG. 2 differs from that of FIG. 1 in that the casing is itself in the shape of a U so that the sides of the core 2 form part of the casing isolating and separating the interior and exterior of the apparatus. Of course, when the apparatus is assembled, the edges of the core 2 are connected to the casing 1 by some means for ensuring leakproofness (for example, welding, glue and the like). The rounded shape of the end of the casing 1 makes it possible to avoid dead volumes which are harmful in certain applications, for example because they can favour bacterial fermentations. In the apparatus of FIG. 2, there are only three fluid inlet and/or outlet tubes, 4, 6 and 7; of course, this characteristic is not connected with the shape of the casing 1 and could very well be employed with a casing such as that of FIG. 1; conversely, an apparatus such as that of FIG. 2 could contain four inlet and/or outlet tubes.

This apparatus of FIG. 2 which contains only 3 tubes can be used especially in reverse osmosis, ultrafiltration and gas permeation.

In practice, the fluid to be fractionated enters via the inlet tube 6 and issues via the outlet tube 7; the osmosate or the ultrafiltrate or the permeate are collected outside the fibres in the casing 1 and leave via the outlet tube 4. According to a variant, the tube 4 can be located on the rounded end of the casing 1.

Figure 3:
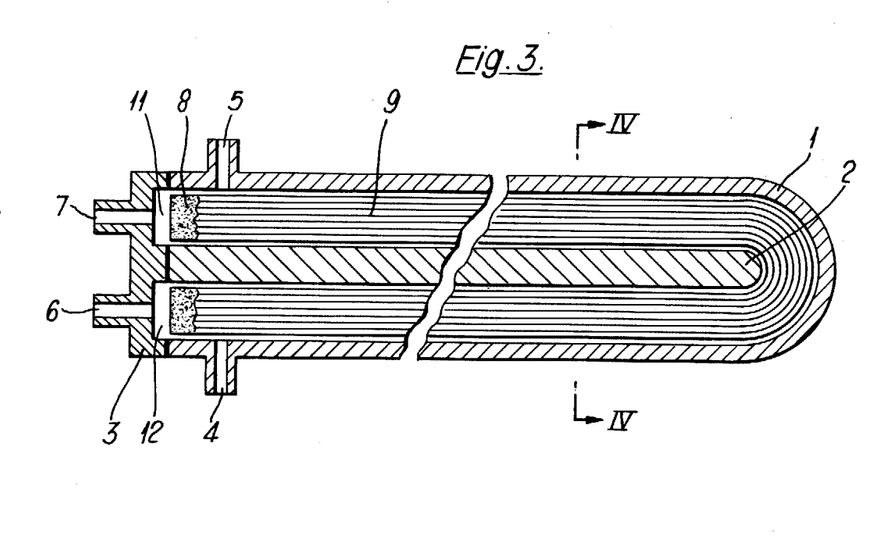
FIGS. 3 and 4 are respectively longitudinal and transverse cross-sections of an apparatus according to the invention which has a shape similar to that of FIG. 2, FIG. 3 being taken on the line III—III of FIG. 4, the latter being taken on the line IV—IV of FIG. 3.
Figure 4:
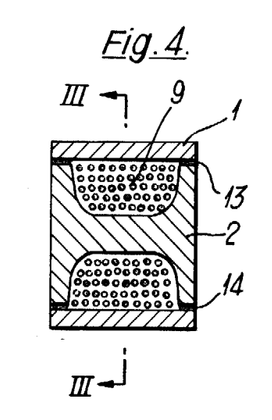

FIGS. 3 and 4 represent longitudinal and transverse cross-sections of an apparatus according to the invention which has inlet and/or outlet tubes like those of the apparatus of FIG. 1 whilst the casing and the core are shaped and arranged like those of the apparatus of FIG. 2.

The reference numerals 1 to 11 denote the same elements in FIGS. 1 to 4.

Jointing zones between the core 2 and the casing 1 are located at 13 and 14, leakproofness at the level of these jointings being ensured either by glue or by a weld, preferably an ultrasonic weld.

Figure 14:
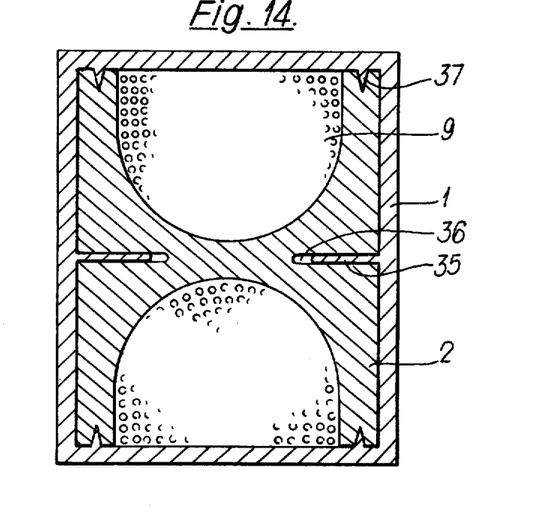
FIG. 14 represents a cross-section of an apparatus according to the invention such as that of FIG. 1.

FIG. 14 represents a cross-section of an apparatus such as that of FIG. 1, showing a particular arrangement of the core 2 and the casing 1 which makes it possible to improve the leakproofness and hence leads to better contact or leaching of the fluids to be treated with the hollow fibres (in the case of ultrafiltration, reverse osmosis and gas permeation with the fluid to be treated outside the hollow fibres, dialysis and more generally exchange operations).

The core 2 having a cross-section in the shape of an H, supports the bundle 9 of hollow fibres. The whole is contained in a casing 1 provided with several longitudinal projections 35 and 37, while the core is equipped with corresponding grooves 36. Of course, it is possible to perfect the leakproofness further by means of glue placed at the level of these projections and grooves or by welding. The projections such as 35 can leave a certain gap 36 in the grooves of the core.

Figures 5, 7:
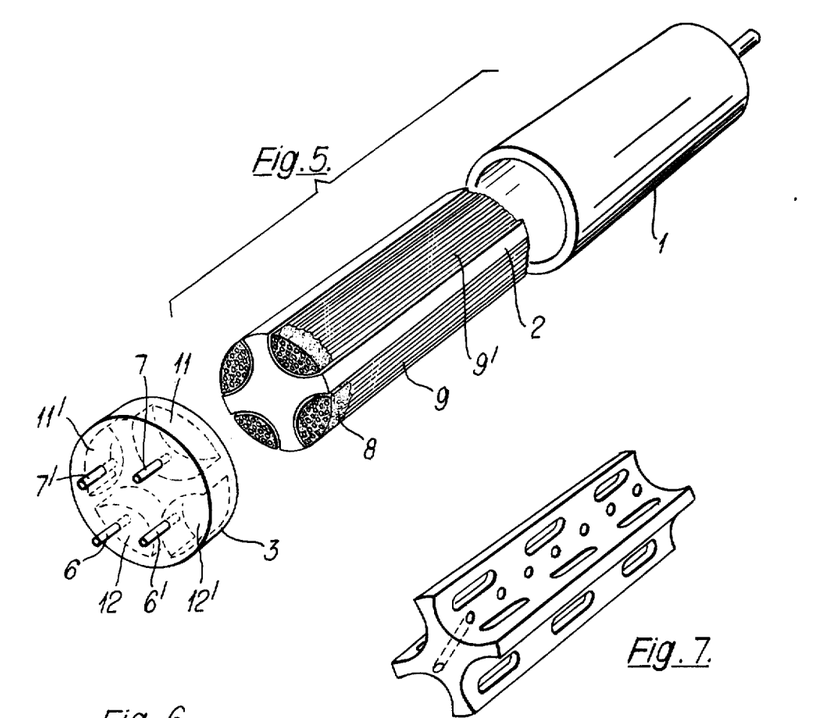
FIG. 5 is an exploded view, in perspective, of an apparatus according to the invention, which is cylindrical and has a cruciform core.
FIG. 7 is a perspective view of a perforated cruciform core.

In the fractionating apparatus shown in FIG. 5, the casing 1 has been shown with only one cylindrical tube 4 but, of course, depending on the use, it would be possible to employ a casing with two or more tubes. Slidable into the casing is a cruciform core 2 on which are mounted independent bundles 9 and 9' of hollow fibres in the shape of a U. The use of a cruciform core makes it possible to produce a more compact apparatus.

The lid 3 has been represented equipped with four compartments 11, 12, 11' and 12' and with four inlet or outlet tubes 6, 6', 7 and 7'.

When this apparatus is used for ultrafiltration, it is possible to ultrafilter two different solutions $S_1$ and $S_2$, $S_1$ being supplied at 6 and leaving at 7, $S_2$ being supplied at 6' and leaving at 7' while the two ultrafiltrates are collected in the casing 1 and are removed via the tube 4.

Of course, if it is desired to fractionate only one solution $S_1$, lid 3 (not shown) is then used which contains only two tubes 6 and 7 and two compartments, namely 12 and 12' connected into one compartment on the one hand and 11 and 11' connected into another compartment on the other hand.

For reverse osmosis, ultrafiltration and gas permeation functioning with the fluid to be treated situated outside the hollow fibres, or for dialysis, direct osmosis and gas-gas or gas-liquid exchanges, the apparatus of FIG. 5 is used preferably in a modified form. The casing 1 is then provided with four tubes, two inlet tubes and two outlet tubes, each located on the side of the hollow fibres and in the vicinity of their ends so that the fluid to be treated is in contact with the maximum length of the hollow fibres. Advantageously, it is possible to provide grooves on each arm of the cruciform core and projections in the casing, as described above for FIG. 14.

Figures 6, 8:
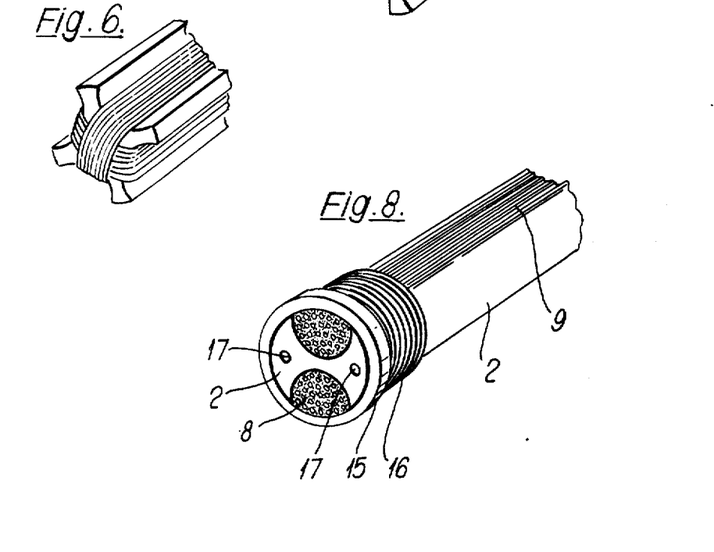
FIG. 6 represents a U-shaped arrangement of the bundles of hollow fibres on a core of FIG. 5.
FIG. 8 is a schematic perspective view of a single fractionating cell.

FIG. 6 shows an advantageous detailed arrangement for the bundles of hollow fibres in the shape of a U at the end of a cruciform core such as that used in FIG. 5.

FIG. 7 represents a cruciform core perforated by numerous holes which facilitate the flow of the fluids around and outside the hollow fibres. These perforations are advantageous in the case of separating apparatus with fluid under pressure outside the hollow fibres, and mainly in the case of apparatus with several bundles inside the same casing (see FIG. 9 described below). The perforations can be so numerous that the core is finally really a grid, provided however that it retains its rigidity. For dialysis, it is preferred to use unperforated cores. Of course, the perforations can also be present on cores which have other shapes, and especially cores in the shape of an H according to FIGS. 1 to 4. Finally, the perforations can pass not only through the arms of the core but also through its central part and, as has been stated above, the core can contain a central channel.

FIG. 8 represents a single fractionating cell which is particularly suited for fractionating apparatus where it is desired that the hollow fibres be interchangeable.

The single fractionating cell of FIG. 8 comprises the core 2 (in the shape of an H in this particular case), and a bundle 9 of hollow fibres in the shape of a U, the open ends of which are embedded in a hardened mass 8. Fixed to the core by welding or preferably gluing, is a collar 15, a part 16 of which is threaded. The threading 16 makes it possible to screw the cell to the casing, which ensures that this single cell can be removed and interchanged; two little holes 17 make screwing and unscrewing possible. The unthreaded part of the collar is wider than the threaded part and thus forms a screwing shoulder, against which a toroid gasket (not shown) can be fitted.

A variant which is not represented in FIG. 8 consists of threading the widest part of the collar 15 in order to attach a lid 3 to it, also by screwing.

When the single fractionating cells have a long core, it can be advantageous to hold the hollow fibres in position, for example, by pieces of elastic in order to prevent the fibres from blending or floating.

Figure 9:
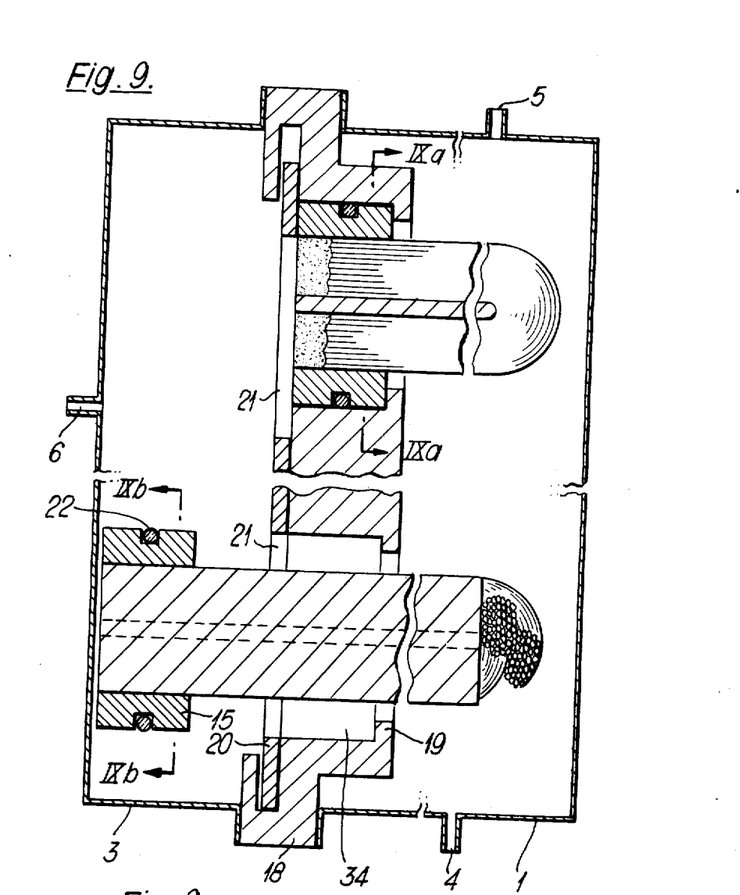
FIG. 9 represents, in cross-section, a fractionating apparatus with several single cells.

FIG. 9 represents a complex fractionating apparatus equipped with several single fractionating cells. The casing 1 of this apparatus is firmly fixed to a base plate 18 containing a series of recesses 34 into which the single fractionating cells are introduced. The collars of the single cells and the recesses shown in FIG. 9 are smooth-walled, clamping of the single cells being achieved on the one hand by shoulders such as 19 and on the other hand by a slide-bar 20 (or locking plate) formed with openings 21, the size of which corresponds substantially to the size of the collar 15 of the single cells. When the opening 21 is opposite the collar 15, the single cell can be removed from its recess and when the slide-bar 20 is moved, the opening 21 is displaced relative to the collar 15 and the single cell is clamped in its recess, a toroid gasket 22 ensuring that the system is leakproof.

Figure 9A:
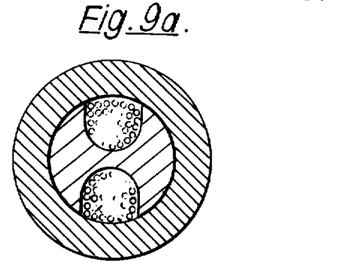
FIGS. 9a and 9b are cross-sections through two forms of single fractionating cells.
Figure 9B:
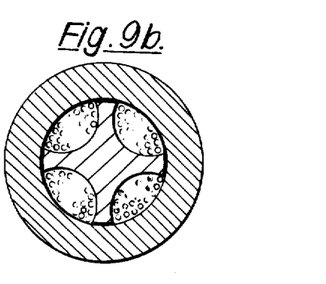

In FIG. 9, a single cell in its recess and a single cell removed from its recess have been shown. It is possible to use single cells with a core in the shape of an H (FIG. 9a) or with a cruciform core (FIG. 9b) equally well.

Furthermore, the single cells of this FIG. 9, which have a collar with a smooth wall can be replaced by single cells with threading such as those described with respect to FIG. 8. Of course, in the latter case, the recesses 34 of the baseplate 18 must themselves be threaded. Such an arrangement makes it possible to avoid the use of a locking plate 20.

As for the lid 3, a single lid which covers the group of all the single fractionating cells has been represented in FIG. 9. Thus the apparatus of FIG. 9 is especially suited for ultrafiltration and reverse osmosis and gas permeating. The fluid to be fractionated flows under pressure between an inlet tube 4 and an outlet tube 5 and the osmosates or ultrafiltrates or permeates are collected in the lid 3 and leave via the tube 6.

A modification of the apparatus of FIG. 9 consists in replacing the single lid 3 by a plurality of lids each corresponding to a single cell.

Of course, and as with the apparatus of the preceding FIGS., it is possible to vary the number of inlet and/or outlet tubes in the lid and/or the casing depending on whether it is desired to carry out dialysis or other methods of fractionation, and depending on whether the fluid to be fractionated must flow outside or inside the hollow fibres.

Figure 16:
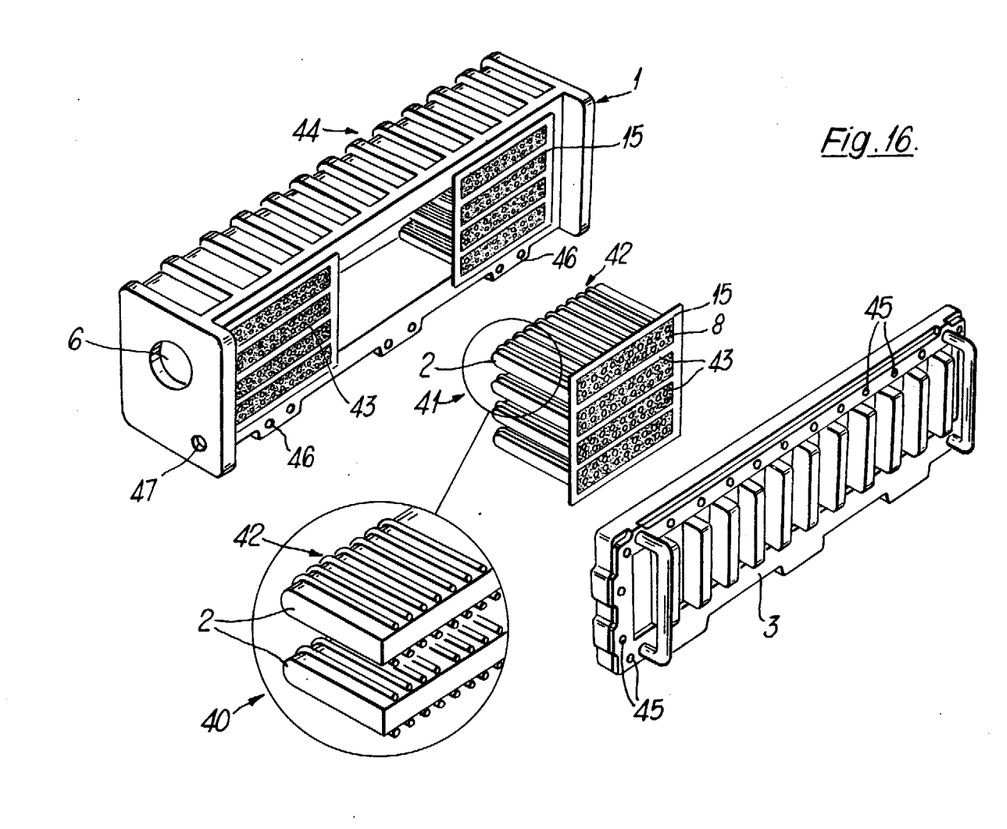
FIG. 16 represents an exploded view, in perspective, of an apparatus according to the invention with cores in the form of a plate.

FIG. 16 is an exploded view, in perspective, of an apparatus according to the invention equipped with three single fractionating cells, the hollow fibres of which are arranged on cores in the form of a plate.

More precisely, this apparatus comprises a casing 1 into which the three single fractionating cells can be introduced. Two of these cells have been represented in position in the casing and the third removed from the casing. Moreover, the part of this single cell situated inside the circle 41 has been represneted, as an enlarged view, inside the circle 40. Each fractionating cell comprises a series of plate shaped cores 2 arranged parallel to one another, and on which the hollow fibres 42 in the shape of a U are placed, the fibres being arranged in the form of a web which can have one or more layers of hollow fibres. A collar 15 clamps the various plate shaped cores 2 of one and the same fractionating cell. In FIG. 16, the collar 15 has been shown provided with bridges 43 which gives it the general form of a grid, the combination (core + fibres + hardened mass) being inserted into the various slits situated between two bridges 43. However, it is possible to dispense with these bridges, in which case the collar 15 is a frame which clamps the hardened mass in which the ends of the plate shaped cores and the ends of the fibres are embedded. The exact shape of the frame 15 is arranged so that it fits into its recess in the casing 1, which is strengthened by ribs 44. The apparatus also comprises a lid 3 which fits over the front of the casing 1 and studs (not shown) projecting from the casing and passing through the holes 45 in order to attach the lid to the casing.

The apparatus thus described is particularly suited to separating operations, and especially ultrafiltration and reverse osmosis and also gas permeation. The liquid (or more generally the fluid) to be treated is introduced via the inlet passage 6 and sweeps over the fibres, parallel to the plane of the cores and perpendicular to the fibres and leaves via an aperture similar to 6 situated on the other side of the casing 1. The permeate leaves from the inside of the hollow fibres on the front of the casing. The lid 3 provides a chamber which makes it possible to collect the permeate from these various fibres, the permeate leaving this chamber via the pipelines 46 machined in the casing 1. These various pipelines 46 are connected to a single collecting channel via the aperture 47 from which the permeate issues.

The cores used in the apparatuses described above can be rectangular or square. They can be strictly flat or undulating.

The invention also provides processes for the manufacture of the apparatuses described above and more particularly of the bundle-core-casing or bundle-core-collar combinations. As will become apparent from the following description, the simplicity of these processes constitutes a great advantage of the invention.

In the text which follows, there is to be understood by the expression "fractionating element" either a single cell (bundle-core-collar combination) or a bundle-core-casing combination.

All these process have the following steps in common, some of which can be concomitant or carried out in another order:

a. the hollow fibres are wound in such a way as to form a skein;

b. this skein is placed on a primary core in the longitudinal position;

c. the fibres are sealed to the core and to one another by means of a material (generally a glue) which can be hardened, this sealing being advantageously carried out at one end of the skein or along a zone in the form of slabs substantially perpendicular to the fibres;

d. the primary core and the hollow fibres are attached to a collar or casing; and e. the skein of hollow fibres and optionally the collar or casing is cut into sections.

In the definition which is given above and in the text which follows, a distinction is made between primary core 2' and secondary core 2. The secondary core 2 is identical to the core 2 which was mentioned above in the fractionating apparatuses of the invention; the primary core 2' is that which supports the skein of hollow fibres, and the difference between the primary core 2' and the secondary core 2 originates from the elements which may be removed during cutting into sections; if the cutting into sections does not affect the primary core 2', but only the hollow fibres, and the glue which combines them, then the primary core 2' and the secondary core 2 are identical.

According to what has been said, carrying out these various steps leads to a fractionating element which is either a single cell when, in step (d) a collar was used, or a bundle-core-casing combination when, in step (d) a casing was used.

The construction of the complete fractionating apparatus must of course be completed, where appropriate, by attaching the single cell to a casing, and in every case by attaching a lid. However, since the operations which are involved are within the scope of those skilled in the art and which are all the more obvious because the means of attachment (threading, glue, gasket and locking plate) have been amply described in the preceding description, these operations will only be described briefly.

Of course, when complex apparatuses such as that of FIG. 9 are constructed, as many single cells are attached as there are recesses in the casing.

Amongst the various possible processes for constructing fractionating elements, three of them $P_1$, $P_2$ and $P_3$ are especially advantageous and will be described in more detail.

The process $P_1$ for the construction of fractionating apparatuses according to the invention comprises:

$a_1$. producing a skein by winding hollow fibre(s) on a primary fixed core, sealing the fibres to the primary core and to one another as they are wound, the sealing being carried out either at one end of the core and of the skein or along a slab substantially perpendicular to the primary core and to the skein, $b_1$. placing a casing or a collar around the sealed zone of the skein, $c_1$. sealing the skein to this casing or collar and $d_1$. cutting the combination produced in step ($c_1$) into sections.

Figure 10:
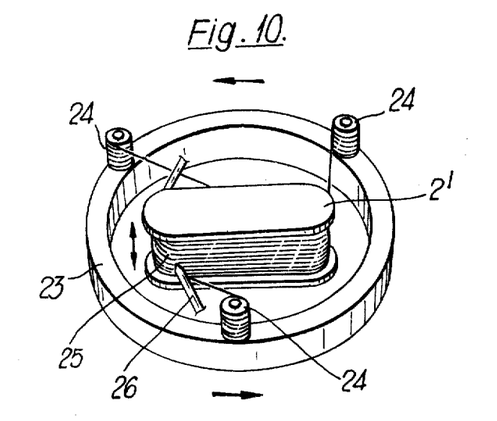
FIGS. 10 and 11 are schematic perspective view of two types of apparatus which can be used for manufacturing skeins intended for the construction of fractionating apparatus according to the invention.

An apparatus which makes it possible to carry out step $a_1$ of the process $P_1$ has been represented in FIG. 10. In this apparatus, the primary core 2' is placed at the centre of a wheel 23 carrying a plurality of bobbins 24 on which the hollow fibres are wound. The primary core 2' is substantially fixed or executes a slight reciprocating movement along a direction perpendicular to the plane of the wheel 23 in order to improve the evenness of the coil of hollow fibres. The wheel 23 revolves, so that the hollow fibres coming from the bobbins 24 wind around the core 2 to form a skein 25. As this coiling is taking place, one or more nozzles 26 spread glue locally on the skein and, with a quick-setting glue, this makes it possible continuously to seal the fibres to the core and to one another.

Figure 15A:
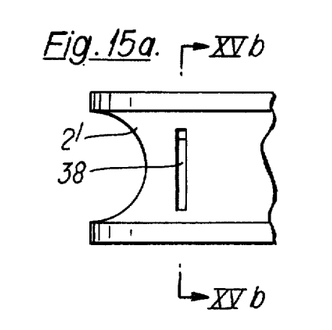
FIG. 15a to 15c represent an end of the core which can be used in the apparatus of FIG. 10.

A variant of a part of this apparatus of FIG. 10 has been shown in FIGS. 15a) to 15c); these figures represent the end of the primary core 2' on which the skein is wound.

Figure 15B:
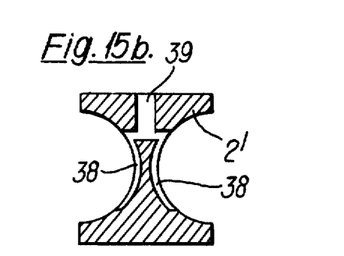
Figure 15C:
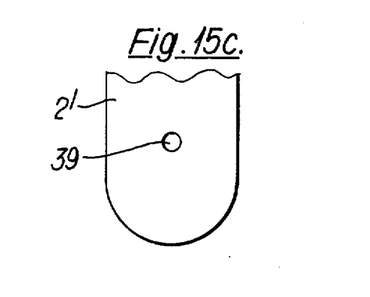

FIG. 15a) represents this end seen in profile;

FIG. 15b) represents a cross-section of the primary core along XVb-XVb of FIGS. 15a and 15c; and FIG. 15c) represents the end of the primary core seen from above.

This primary core is formed with an orifice 39 through which glue is introduced as winding takes place, the orifice 39 being connected via the inside of the primary core to two slits 38 through which the glue can flow to coat the fibres. The arrangement of FIGS. 15a) to 15c) makes it possible to dispense with the nozzles 26 of the apparatus of FIG. 10, it being possible for these nozzles to interfere with the winding in certain cases.

Figure 11:
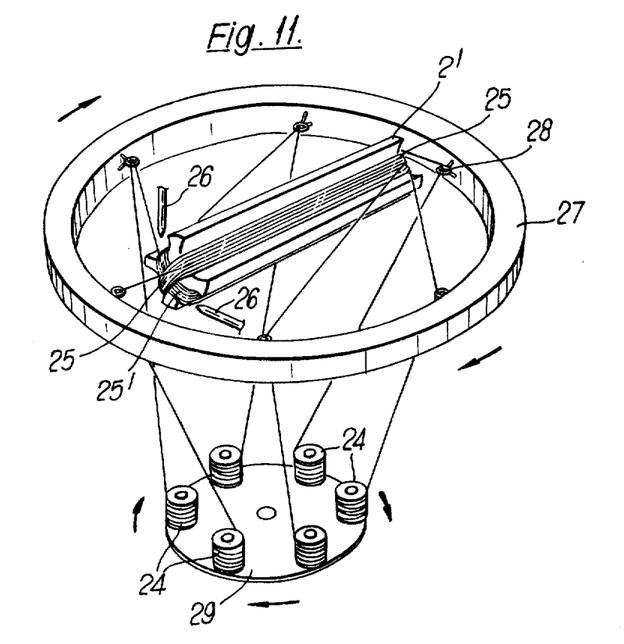

Another apparatus which makes it possible to carry out step $a_1$ of the process $P_1$ has been shown in FIG. 11. This apparatus comprises a revolving plate 29 on which are mounted bobbins 24 of hollow fibres; a primary cruciform core 2' is mounted on a support which is not shown but which makes it possible optionally to rotate the core 2' by ¼ revolution.

Around the primary core, a wheel 27 is equipped with fibre-guide-rings 28. In normal operation, the primary core 2' is fixed and the plate 29 and the wheel 27 revolve so that the hollow fibres wind up on the primary core in such a way as to form a first skein 25. When two of the grooves of the primary cross-shaped core are full, the primary core is rotated through a quarter of a revolution in order to fill the other two grooves with a second skein 25'. As in FIG. 10, nozzles 26 ensure the supply of glue and continuous sealing. Of course, these nozzles 26 can be removed subject to the condition that the primary core is equipped with slits in accordance with an arrangement similar to that represented in FIGS. 15a) to 15c).

Step $b_1$, which follows step $a_1$, of the process $P_1$ consists of placing a casing or a collar around the sealed zone of the skein; this positioning is carried out in such a way that the opening of the casing or of the collar is in a plane substantially perpendicular to the primary core and containing the seal made during step $a_1$.

The sealing of the skein to the collar or casing, step $c_1$, can be carried out by injecting glue between the skein and the collar or casing and against them, followed by hardening the glue. It is also possible and advantageous to weld the primary core to the collar or casing. The choice between gluing and welding depends in particular on the type of apparatus chosen; with an apparatus according to FIG. 2 it is preferred to weld the core to the casing; more precisely, welding can be carried out with or without supplying material. Conventional heat-welding or ultrasonic welding can be used.

Once these steps ($a_1$) to ($c_1$) have been carried out, the combination produced is cut into two sections, step $d_1$. The skein of fibres, the hardened mass of the seal, the primary core and optionally the casing or collar are cut simultaneously; generally sectioning of the casing or collar is avoided only if it is possible to section the skein along a plane situated at the surface of the collar or casing, that is to say flush with the collar of casing.

If the seal has been made near one end of the skein, only the long part (bundle of hollow fibres in the shape of a U supported by the secondary core) produced by cutting is retained to form the fractionating element according to the invention. If, however, the seal has been made at the middle of the skein, two bundles of hollow fibres in the shape of a U are obtained on cutting and each of them can be used to form a fractionating element according to the invention.

Figure 13A:
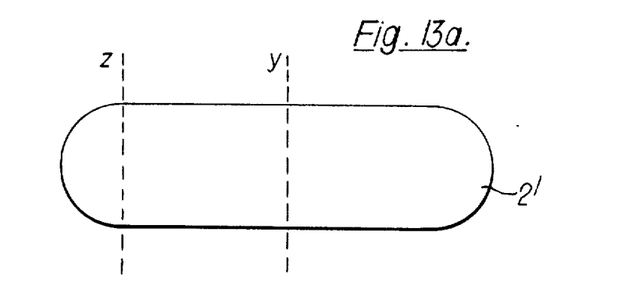
FIGS. 13a and 13b are a side elevation and plan of a core carrying a skein.
Figure 13B:
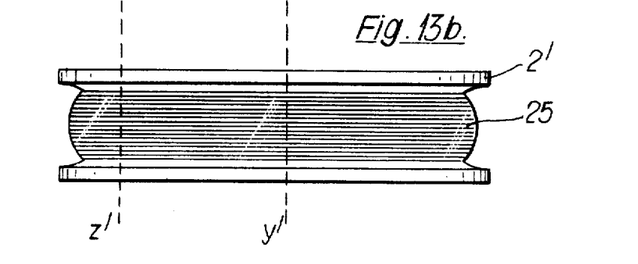

FIG. 13 shows a primary core 2' in the shape of an H, (represented in side elevation and plan) carrying a skein 25 of hollow fibres, on which are marked two planes YY' and ZZ' along which the skein and the primary core can be cut. The plane ZZ' corresponds to sectioning the skein at one of its ends; only the right-hand parts of the fibres and the core are retained. The plane YY' corresponds to sectioning the skein at its centre, along a plane substantially perpendicular to the fibres; both halves resulting from this cutting can be retained to make it possible to construct single fractionating cells or a fractionating apparatus according to the invention.

In this FIG. 13, the collar to casing sealed to the skein-core combination has not been represented but, as was stated above, the sectioning along the planes YY' or ZZ' either also sections the collar or casing or is carried out flush with the collar or casing.

The cutting itself can be carried out by any means which is in itself known, and especially by means of a sharp blade or by sawing; it is advantageously finished off by planing, for example by means of a microtome which makes the cut cleaner.

Figure 12:
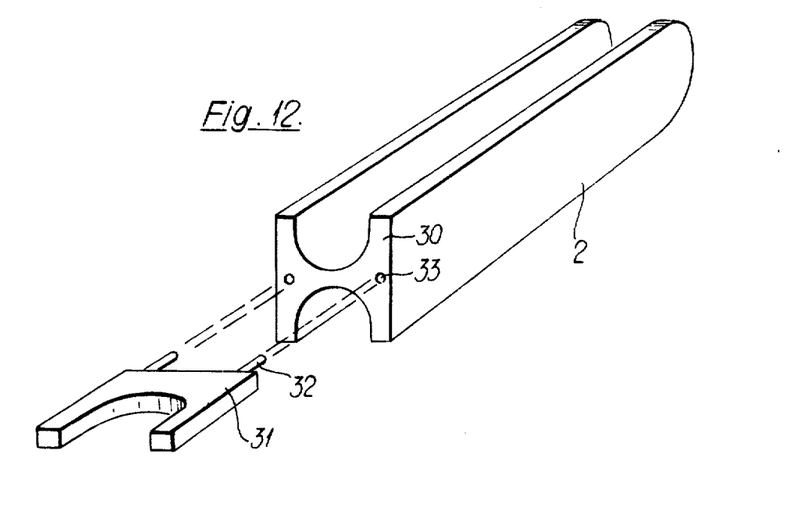
FIG. 12 is an exploded perspective view of a particular type of core especially suited for the construction of fractionating apparatus according to the invention.

FIG. 12 represents a type of primary core especially designed to make cutting easier. This primary core essentially comprises two parts, one of which is elongate and (after cutting) will form the secondary core 2 which is the actual core which is mounted in the fractionating apparatus of the invention, this elongate part having a flat end 30. The other part of the primary core is a U-shaped plate 31 carrying two studs 32 corresponding to two holes 33 provided in the secondary core 2.

Such a primary core can be modified, for example, to provide a cruciform core in which case the U-shaped plate is also in the form of a cross and can carry four studs.

With a primary core such as that of this FIG. 12, the step ($a_1$) of the process $P_1$ is advantageously carried out in such a way that the seal is situated at the level of the flat end 30. The sectioning itself is also carried out flush with the plane 30. This system makes the sectioning considerably easier: in effect, scarcely anything remains other than the hollow fibres and the studs to be cut and not the body of the primary core. Furthermore, by removing the U-shaped plate in time it is even possible to avoid sectioning the studs.

A second process $P_2$ involves:

$a_2$. placing a skein of hollow fibres longitudinally on a primary core, either by winding the hollow fibres directly onto this core or by winding on an intermediate coil support and transferring the skein onto the primary core, $b_2$. placing a collar or casing on the core-skein combination produced in step $a_2$, $c_2$. sealing the fibres-core-casing or -collar combination produced in step ($b_2$); and $d_2$. cutting the sealed combination produced in step ($c_2$).

The value of this process resides especially in the fact that a single seal has to be made.

The winding up according to step ($a_2$) can be carried out in accordance with the techniques described above, with a fixed coil support; conversely, it is also possible to carry out the winding up with a revolving coil support.

The coil support can consist of the primary core or of the secondary core (FIG. 12). When an intermediate coil support which does not comprise the core is used, it is preferable for this coil support to be contractible, which makes it possible to remove the skein easily therefrom in order to transfer the skein onto the primary core.

The casing or collar of step ($b_2$) is placed in position under the conditions described with respect to step ($b_1$) of the process $P_1$. It must be stated that, in certain cases, seals or jointings have to be produced in order to achieve leakproofness in certain areas (see above the statement relating to zone (10) of FIG. 1).

The sealing of step ($c_2$) is preferably carried out by injecting the sealing agent (generally glue) between the hollow fibres, the core and the collar or casing and then hardening the glue; by virtue of the arrangement of the fibres in a skein, there is no risk of glue penetrating to inside the fibres and thus no particular precaution need be taken in order to prevent the sealing agent from entering the fibres.

The injection of glue between the hollow fibres is in practice considerably facilitated by low frequency vibrations of the core-skein combination; these vibrations make it possible to remove bubbles from the glue as well as to distribute the fibres and the glue better. Finally the cutting of step ($d_2$) is carried out under the conditions described with respect to step ($d_1$).

A third process $P_3$ for the construction of a fractionating apparatus comprises:

$a_3$. placing a skein of fibres longitudinally on a primary core, either by winding the hollow fibres directly onto this primary core, or by winding on an intermediate coil support and transferring the skein onto the primary core, $b_3$. sealing the fibres to one another and to the core, this step ($b_3$) being carried out at the same time as, or subsequent to step ($a_3$);

$c_3$. cutting the skein-primary core combination; and $d_3$. attaching the secondary core-fibre bundle combination to a casing or collar.

The methods for carrying out the various steps ($a_3$) to ($d_3$) are similar to those of the corresponding steps of the processes $P_1$ and $P_2$. This process $P_3$ is especially valuable for apparatuses in which the secondary core forms part of the casing (tube case especially of FIG. 2).

In accordance with what has been stated above, the fractionating elements constructed by the processes $P_1$, $P_2$ or $P_3$ must be finished off in order to produce a complete fractionating apparatus according to the invention. If a single cell (bundle of hollow fibres + core + collar) is involved, a casing and a lid must be added. If a hollow fibres + core + casing combination is involved, a lid must be added.

The method of attaching a lid 3 depends especially on the ease with which it is desired to be able to dismantle the fractionating apparatus. If it is not necessary to dismantle the apparatus, for example, for repair or cleaning, it then suffices to glue (or weld) the lid to the casing 1 on the one hand and to the end of the secondary core on the other hand. However, if it is desired to be able to dismantle the apparatus, the lid 3 is preferably removable and any workable closing system which is in itself known in then used; leakproofness of the apparatus is then achieved by means of gaskets which are held tightly by the closing system.

The body of the fractionating apparatuses according to the invention, having regard especially both to the casing and to the lid, the core and the collar, can be made of any solid, rigid and leakproof material, and especially of metal or preferably of a synthetic polymer; semi-rigid materials can also be used.

As has been stated above, the fractionating apparatuses according to the invention can be used for dialysis, ultrafiltration, reverse osmosis and gas permeation. Various more precise applications are such as those mentioned in French Pat. No. 1,307,979; the artificial kidney for dialysis and/or ultrafiltration and the artificial lung must be mentioned especially as valuable applications.

The main advantages of the fractionating apparatuses of the invention are the ease with which they are constructed and the possibilities for producing removable, interchangeable, simple or multiple bundles.

We claim:

1. Apparatus which can be used especially for fractionating fluid mixtures, said apparatus comprising, in combination:
   a. a jacket;
   b. a plurality of hollow fibres arranged in the shape of at least one U and positioned within the jacket;
   c. a core supporting the hollow fibres and placed inside the branches of the U;
   d. means defining at least one groove in which said hollow fibres are located;
   e. means for fixing the fibres to one another at their ends, said means being firmly fixed to the core;
   f. at least one fluid inlet passage formed in the jacket; and
   g. at least one fluid outlet passage formed in the jacket.

2. Apparatus as claimed in claim 1, in which the said groove is a U-shaped groove.

3. Apparatus as claimed in claim 1 in which the core has a cross-section in the shape of an H.

4. Apparatus as claimed in claim 3, wherein the end of the core with a cross-section in the shape of an H is rounded and the casing is in the shape of a U.

5. Apparatus as claimed in claim 1, wherein said core is of cruciform cross-section.

6. Apparatus as claimed in claim 1, wherein said core forms a part of said jacket.

7. Apparatus as claimed in claim 1, wherein said core is perforated.

8. Apparatus as claimed in claim 7, and further comprising an axially extending central channel in said core, this central channel being connected to outside the core by small channels.

9. Apparatus as claimed in claim 1, wherein the jacket comprises a lid and a casing.

10. Apparatus as claimed in claim 9, and further comprising means defining at least two compartments in said lid corresponding to each of the branches of said at least one U-shaped bundle of hollow fibres, each of these compartments being equipped with an inlet or outlet passage.

11. Apparatus as claimed in claim 10, wherein there are two inlet passages and two outlet passages, the casing containing one inlet passage and one outlet passage, and the lid containing the other two passages.

12. Apparatus as claimed in claim 10, wherein there are one inlet passage and two outlet passages; one outlet passage being formed in the lid and connected to inside the hollow fibres and the other two passages being formed in the casing and connected to outside the hollow fibres.

13. Apparatus as claimed in claim 10, wherein there are one inlet passage and two outlet passages, one outlet passage being formed in the casing and connected to outside the hollow fibres and the other two passages being machined in the lid and connected to inside the hollow fibres.

14. Apparatus as claimed in claim 1, wherein the means for fixing the fibres is a hardened mass, in which the non-sealed ends of the hollow fibres are embedded.

15. A single fractionating cell mountable in a jacket, said cell comprising, in combination:
   a. a plurality of hollow fibres arranged in the shape of at least one U;
   b. a core supporting the hollow fibres and placed inside the branches of the U;
   c. means defining at least one groove in which said hollow fibres are located.
   d. means for fixing the fibres to one another at their ends, said means being firmly fixed to the core; and
   e. a collar surrounding said fixing means.

16. A cell as claimed in claim 15, wherein the collar is threaded.

17. Process for the manufacture of a fractionating element, for use in apparatus for fractionating fluid mixtures, said process comprising the steps of:
   a. winding hollow fibres in such a way as to form a skein;
   b. placing said skein in the groove of a primary core in the longitudinal position;
   c. sealing the fibres to the core and to one another by means of a hardenable material;
   d. attaching the primary core and the hollow fibres to a casing; and
   e. cutting the skein of hollow fibres transversely of their length to form at least one U-shaped bundle of hollow fibres.

18. A process as claimed in claim 17, wherein the casing is cut simultaneously with the hollow fibres.

19. A process as claimed in claim 17, wherein:
   $a_1$. the skein is produced by winding the hollow fibres in the groove of a fixed primary core, sealing the fibres to the primary core and to one another as they are wound;
   $b_1$. the casing is placed around the sealed zone of the skein;
   $c_1$. the skein is sealed to this casing to form an assembly; and
   $d_1$. the assembly is cut transversely.

20. A process as claimed in claim 17, wherein:
   $a_2$. the skein of hollow fibres is placed longitudinally on a primary core by winding the hollow fibres directly in the groove of this primary core;
   $b_2$. the casing is placed on the thus formed core and skein combination;
   $c_2$. the fibres-core-casing combination produced in step ($b_2$) is sealed and
   $d_2$. the thus sealed combination is cut transversely.

21. A process as claimed in claim 17, wherein:
   $a_2$. the skein of hollow fibres is placed longitudinally in the groove of a primary core by winding on an intermediate coil support and transferring the skein onto the primary core;
   $b_2$. the casing is placed on the thus formed core and skein combination;
   $c_2$. the fibres-core-casing combination produced in step ($b_2$) is sealed; and
   $d_2$. the thus sealed combination is cut transversely.

22. A process as claimed in claim 17, wherein:
   $a_3$. a skein of fibres is placed longitudinally on a primary core by winding the hollow fibres directly in the groove of this primary core;
   $b_3$. the fibres are sealed to one another and to the primary core;
   $c_3$. the skein-primary core combination is cut transversely; and
   $d_3$. the secondary core-bundle of fibres combination is attached to a casing.

23. A process as claimed in claim 17, wherein:
   $a_3$. a skein of fibres is placed longitudinally in the groove of a primary core, by winding on an intermediate coil support and transferring the skein onto the primary core;
   $b_3$. the fibres are sealed to one another and to the primary core;
   $c_3$. the skein-primary core combination is cut transversely; and
   is attached to a casing.

24. A process as claimed in claim 17, wherein the primary core is provided with a slit through which glue is introduced in order to carry out the sealing step.

25. A process as claimed in claim 17, wherein the skein is formed by winding in the groove of the fixed primary core by means of a revolving wheel carrying bobbins of fibres or fibre guide rings.

26. A process as claimed in claim 17, wherein the casing is attached to the core by welding.

27. A process as claimed in claim 17, wherein the cutting is carried out flush with the end of the casing.

28. A process as claimed in claim 17, wherein the primary core consists of a secondary core and a U-shaped plate.

29. A process as claimed in claim 28, wherein the cutting is carried out flush with the secondary core.

* * * * *